US012562475B2

(12) United States Patent
Humphrey et al.

(10) Patent No.: US 12,562,475 B2
(45) Date of Patent: Feb. 24, 2026

(54) ELECTRONIC SCANNING ANTENNA

(71) Applicant: PROVIZIO LIMITED, Limerick (IE)

(72) Inventors: Denver Humphrey, Ballymena (GB); Peter Ludlow, Lisburn (GB); Steven Christie, Drumbo (GB)

(73) Assignee: PROVIZIO LIMITED, Limerick (IE)

( * ) Notice: Subject to any disclaimer, the term of this patent is extended or adjusted under 35 U.S.C. 154(b) by 100 days.

(21) Appl. No.: 18/713,912

(22) PCT Filed: Nov. 3, 2022

(86) PCT No.: PCT/EP2022/080744
§ 371 (c)(1),
(2) Date: May 28, 2024

(87) PCT Pub. No.: WO2023/094132
PCT Pub. Date: Jun. 1, 2023

(65) Prior Publication Data

US 2024/0405428 A1 Dec. 5, 2024

(30) Foreign Application Priority Data

Nov. 29, 2021 (EP) ..................................... 21210978

(51) Int. Cl.
*H01Q 3/42* (2006.01)
*H01Q 1/50* (2006.01)

(52) U.S. Cl.
CPC ................. *H01Q 3/42* (2013.01); *H01Q 1/50* (2013.01)

(58) Field of Classification Search
CPC .......... H01Q 3/42; H01Q 1/50; H01Q 25/002; H01Q 21/0075; H01Q 21/065
See application file for complete search history.

(56) References Cited

U.S. PATENT DOCUMENTS 3,766,558 A 10/1973 Keuchken
3,953,852 A 4/1976 Anderson et al.
6,104,343 A * 8/2000 Brookner ............... H01Q 25/00 342/372

(Continued)

FOREIGN PATENT DOCUMENTS

CN 117353008 A * 1/2024 ............... H01Q 1/38

OTHER PUBLICATIONS

PCT/EP2022/080744. International Search Report & Written Opinion (Feb. 3, 2023).

*Primary Examiner* — Seokjin Kim
(74) *Attorney, Agent, or Firm* — Anthony Smyth; LOZA & LOZA, LLP

(57) ABSTRACT

The present invention relates to an electronic beam steering antenna, that includes a plurality of antenna elements disposed in a spaced apart manner with respect to each other, wherein beam steering occurs along an axis connecting the plurality of antenna elements, wherein a feed line is provided between each of the adjacent antenna elements, and wherein each of the feed lines are connected in series along said axis, and wherein each antenna element radiates a mixed signal generated by combining frequencies of first and second input signals, wherein the first input signal is received from an output of a feed line preceding said antenna element and has a frequency which varies with change in beam pointing angle along said axis.

8 Claims, 9 Drawing Sheets

(56) References Cited

U.S. PATENT DOCUMENTS

| | | | | |
|---|---|---|---|---|
| 6,232,920 | B1 * | 5/2001 | Brookner | H01Q 21/061 342/372 |
| 6,650,290 | B1 * | 11/2003 | Chang | H01Q 21/0006 455/430 |
| 10,218,068 | B1 * | 2/2019 | Loui | H01Q 3/34 |
| 10,284,271 | B1 * | 5/2019 | Rajendran | H04B 7/0617 |
| 10,439,851 | B2 * | 10/2019 | Novak | H01Q 3/42 |
| 10,897,082 | B1 * | 1/2021 | Legare | H01Q 3/40 |
| 11,089,595 | B1 * | 8/2021 | Frigon | H04B 7/0452 |
| 2004/0085933 | A1 * | 5/2004 | Wang | H01Q 1/288 370/334 |
| 2005/0093737 | A1 * | 5/2005 | Schoebel | H01P 1/184 342/72 |
| 2012/0050107 | A1 * | 3/2012 | Mortazawi | H01Q 21/0006 342/372 |
| 2016/0049728 | A1 * | 2/2016 | Ho | H01Q 3/28 342/368 |
| 2016/0218429 | A1 * | 7/2016 | Klemes | H03K 5/01 |
| 2018/0054006 | A1 * | 2/2018 | Wang | H01Q 21/24 |
| 2018/0083813 | A1 * | 3/2018 | Novak | H04B 7/0617 |
| 2024/0072434 | A1 * | 2/2024 | Braun | H01P 5/16 |
| 2024/0162608 | A1 * | 5/2024 | Kelly | H01Q 3/36 |
| 2024/0219552 | A1 * | 7/2024 | Ludlow | G01S 13/347 |

* cited by examiner

ELECTRONIC SCANNING ANTENNA

CLAIM OF PRIORITY

This application is the U.S. National Stage of International Patent Application No. PCT/EP2022/080744 filed 3 Nov. 2022, which claims priority to European Patent Application No. EP 21210978.9 filed 29 Nov. 2021, the entire content of these applications being incorporated herein by reference as if fully set forth below in their entirety and for all applicable purposes.

FIELD

The present disclosure relates to an electronic scanning antenna and more particularly to electronically moving or angularly scanning a narrow beam from an antenna at very high radio frequencies.

BACKGROUND OF INVENTION

The phased array or 'electronically scanned array' is the most common form of electronic beam-steering where the RF signal from the transmitter (or receiver) is fed to (or from) the individual antennas, with the correct phase relationship, so that the signals from the separate antennas combine to increase the radiation in a desired direction but cancel to suppress radiation in undesired directions. The typical method of feeding the individual antenna elements is to ensure an identical path length to each, meaning that the direction of signal combination is entirely dependent on the phases applied by the phase-shifters (or switched line lengths) at each element. Whilst a phased array is the most common method for electronic beam-steering, there are a number of issues that makes such an implementation unfeasible for high frequency mm-wave operation, where the size of the phase-shifters become significantly large compared to the antenna element, which varies inversely in size to the operating frequency. Therefore, it becomes difficult to manufacture the antenna array at high operating frequencies.

Other types of electronic beam-steering antennas can be formed by using lens type beamformers (such as Rotman, Luneburg, R-KR), which direct the beam according to the position on the lens at which the signal is applied. Such methods however have limited angle adjustment and are lossy, meaning that signals applied to them can be severely attenuated.

In alternative systems, mechanical beam steering is still commonly used, where the beam is moved by mechanical means such as a turntable. These methods however, tend to be large and cumbersome, require considerable maintenance (such as lubrication) and need to be calibrated more frequently. US Patent Publication No. US 2004/0085933 describes a satellite antenna system employing electronic elevation control for signal acquisition and tracking. U.S. Pat. No. 3,766,558 describes a raster scan antenna. U.S. Pat. No. 3,953,852 describes a wide bandwidth phase scanning with simple controls.

In view of the above, there is a need for an antenna configuration that provides a robust solution for problems identified in the art and enables beam scanning/steering at high operating frequencies.

SUMMARY OF INVENTION

The present invention relates to an electronic beam-steering antenna as set out in the appended claims.

In an aspect of the present invention, there is provided electronic beam-steering antenna, comprising:

a plurality of antenna elements disposed in a spaced apart manner with respect to each other, wherein beam steering occurs along an axis connecting the plurality of antenna elements, wherein a feed line is provided between each of the adjacent antenna elements, and wherein each of the feed lines are connected in series along said axis, and wherein each antenna element radiates a mixed signal generated by combining frequencies of first and second input signals, wherein the first input signal is received from an output of a feed line preceding said antenna element and has a first frequency which varies with a change in beam pointing angle along said axis;

a plurality of mixer elements corresponding to the plurality of antenna elements, wherein each mixer element has an output port connected to an input port of the respective antenna element;

a series feed network formed from the feed lines connected in series, each feed line being provided between adjacent mixer elements, and a branched output of each feed line connected in series preceding a mixer element is connected to a first input port of said mixer element; and a parallel feed network for feeding a second input port of each mixer element with the second input signal having a second frequency from a common connection point, where the length of each parallel feed line from the common connection point to each mixer element is the same, wherein each antenna element is a series-fed array and wherein the beam steering additionally occurs along a second axis connecting resonant elements of the respective series-fed array, wherein the second axis is perpendicular to the first axis, and the beam pointing angle.

In another aspect of the present invention, there is provided an electronic beam-steering antenna comprising:

a plurality of antenna elements disposed in a spaced apart manner with respect to each other, wherein a feed line is provided between each of the adjacent antenna elements, and wherein each antenna element radiates a mixed signal generated by combining frequencies of first and second input signals, wherein the plurality of the antenna elements are positioned in a matrix configuration of n+1 rows and m+1 columns, and a plurality of mixer elements corresponding to the plurality of antenna elements is also positioned in the matrix configuration of n+1 rows and m+1 columns, and wherein feed lines connected in series along each row form a first set of series feed networks, and feed lines connected in series along each column form a second set of series feed networks, and wherein beam steering occurs along the first and second axes corresponding to first and second frequencies applied to the first and second sets of series feed networks;

a first parallel feed network for feeding an input of each series feed network of the first set from a first common connection point, wherein the length from the first common connection point to the input of each series feed network of the first set is the same; and a second parallel feed network for feeding an input of each series feed network of the second set from a second common connection point, wherein the length from the second common connection point to the input of each series feed network of the second set is the same;

a first voltage controlled oscillator ($VCO_1$) for feeding an input signal to the first common connection point, wherein the $VCO_1$ outputs the first frequency that varies with respect to a first centre frequency, with a change in the beam pointing angle along the first axis;

a second VCO ($VCO_2$) for feeding an input signal to the second common connection point, wherein the $VCO_2$ outputs the second frequency that varies with respect to a second centre frequency, with a change in the beam pointing angle along the second axis, wherein each mixer element receives the first input signal at a first input port branching off from a feed line preceding said antenna element along the first axis, and the second input signal at a second input port branching off from a feed line preceding said antenna element along the second axis, to generate a mixed signal of an output frequency, wherein the output frequency is the sum of the first and second frequencies;

a plurality of additional mixer elements corresponding to the plurality of mixer elements, each additional mixer element having a first input port connected to an output port of a respective mixer element, a second input port connected to a third common connection point, and an output port connected to the respective antenna element;

a third parallel feed network for feeding the second input port of each additional mixer element from the third common connection point, wherein the length from the third connection point to the second input port of each additional mixer element is the same; and a third voltage controlled oscillator ($VCO_3$) for feeding an input signal to the third common connection point, wherein the $VCO_3$ has a third frequency that varies with respect to a third centre frequency by the negative of the sum of the change in the frequencies of $VCO_1$ and $VCO_2$, wherein each additional mixer element combines the signals received from the outputs of the respective mixer element and the third common connection point to generate a mixed signal of constant output frequency, wherein the constant output frequency is the sum of the first, second and third centre frequencies.

In another aspect of the present invention, there is provided an electronic beam-steering antenna that includes a plurality of antenna elements disposed in a spaced apart manner with respect to each other, wherein beam steering occurs along an axis connecting the plurality of antenna elements, wherein a feed line is provided between each of adjacent antenna elements, and wherein each of the feed lines are connected in series along said axis, and wherein each antenna element radiates a mixed signal generated by combining frequencies of first and second input signals, wherein the first input signal is received from an output of a feed line preceding said antenna element and has a frequency which varies, with a change in beam pointing angle along said axis.

In an embodiment of the present invention, the electronic beam-steering antenna further comprises a plurality of mixer elements provided corresponding to the plurality of antenna elements, wherein each mixer element has an output port connected to an input port of the respective antenna element; a series feed network formed from the feed lines connected in series, each feed line being provided between adjacent mixer elements, and a branched output of each feed line connected in series preceding a mixer element is connected to a first input port of said mixer element; and a parallel feed network for feeding a second input port of each mixer element with the second input signal from a common connection point, where the length of each parallel feed line from the common connection point to each mixer element is the same.

In an embodiment of the present invention, the electronic beam-steering antenna further comprises a first voltage controlled oscillator ($VCO_1$) for feeding the input signal to the series feed network, wherein the $VCO_1$ has a first frequency that varies with respect to a first centre frequency, with a change in the beam pointing angle along said axis; and a second VCO ($VCO_2$) provided at an input of the common connection point, for feeding the second input signal to the parallel feed network, wherein the $VCO_2$ has a second centre frequency and outputs a signal of a second frequency, wherein each mixer element combines the signals received from the respective series and parallel feed networks, to generate a mixed signal at the output frequency, and wherein the output frequency is the sum of the first and second frequencies.

In an embodiment of the present invention, the fixed line length of each feed line forming the series feed network is set to be a guided wavelength of the first centre frequency.

In an embodiment of the present invention, when the second frequency varies with respect to a second centre frequency by the negative of the change in frequency of the $VCO_1$, the output frequency is a constant frequency, and is the sum of the first and second centre frequencies.

In an embodiment of the present invention, wherein when each antenna element is a series-fed array, the beam steering additionally occurs along a second axis connecting resonant elements of the respective series-fed array, wherein the second axis is perpendicular to the first axis, and the beam pointing angle along the second axis varies by varying the second frequency.

In an embodiment of the present invention, the plurality of the antenna elements are positioned in a matrix configuration of (n+1) rows and (m+1) columns, and a plurality of mixer elements corresponding to the plurality of antenna elements is also positioned in the matrix configuration of (n+1) rows and (m+1) columns, and wherein the feed lines connected in series along each row form a first set of series feed networks, and the feed lines connected in series along each column form a second set of series feed networks, and wherein the beam steering occurs along the first and second axes corresponding to the first and second frequencies applied to the first and second sets of series feed networks.

In an embodiment of the present invention, the electronic beam-steering antenna further comprises a first parallel feed network for feeding an input of each series feed network of the first set from a first common connection point, wherein the length from the first common connection point to the input of each series feed network of the first set is the same; and a second parallel feed network for feeding an input of each series feed network of the second set from a second common connection point, wherein the length from the second common connection point to the input of each series feed network of the second set is the same.

In an embodiment of the present invention, the electronic beam-steering antenna further comprises a first voltage controlled oscillator ($VCO_1$) for feeding an input signal to the first common connection point, wherein the $VCO_1$ has a first frequency that varies with respect to a first centre frequency, with a change in the beam pointing angle along the first axis; a second VCO ($VCO_2$) for feeding an input signal to the second common connection point, wherein the $VCO_2$ has a second frequency that varies with respect to a second centre frequency, with a change in the beam pointing angle along the second axis, wherein each mixer element receives the first input signal at a first input port branching off from a feed line preceding said antenna element along the first axis, and the second input signal at a second input port branching off from a feed line preceding said antenna element along the second axis, to generate a mixed signal of an output frequency, wherein the output frequency is the sum of the first and second frequencies.

In an embodiment of the present invention, the electronic beam-steering antenna further comprises a plurality of additional mixer elements corresponding to the plurality of mixer elements, each additional mixer element having a first input port connected to an output port of a respective mixer element, a second input port connected to a third common connection point, and an output port connected to the respective antenna element; a third parallel feed network for feeding the second input port of each additional mixer element from the third common connection point, wherein the length from the third connection point to the second input port of each additional mixer element is the same; and a third voltage controlled oscillator ($VCO_3$) for feeding an input signal to the third common connection point, wherein the VCOs has a third frequency that varies with respect to a third centre frequency by the negative of the sum of the change in the frequencies of $VCO_1$ and $VCO_2$, wherein each additional mixer element combines the signals received from the outputs of the respective mixer element and the third common connection point, to generate a mixed signal of constant output frequency, wherein the constant output frequency is the sum of the first, second and third centre frequencies.

In an embodiment of the present invention, wherein each additional mixer element is integrated into the respective antenna element.

In an embodiment of the present invention, wherein each mixer element is integrated into the respective antenna element.

In an embodiment of the present invention, the electronic beam-steering antenna further comprises one or more amplifiers integrated with at least one of: an antenna element and a mixer element.

In an embodiment of the present invention, the feed lines are formed using a multilayer substrate structure.

In an embodiment of the present invention, wherein each feed line of fixed line length of a series feed network introduces a phase delay of $\Delta\phi$ between adjacent mixer elements, and the phase delay increases by a further value of $\Delta\phi$ at each consecutive mixer element along the corresponding series feed network.

In an embodiment of the present invention, wherein each feed line of a series feed network introduces a phase delay between adjacent mixer elements in proportion to separation distance between adjacent antenna elements, and the phase delay increases at each consecutive mixer element along the corresponding series feed network.

Various electronic beam-steering/scanning antenna configurations as described in various embodiments achieve electronic beam-steering without the need for physically large phase-shifter components at each antenna element, and without limiting the frequency of operation to approx. 50 GHz due to the size constraints. The removal of large phase-shifter components reduces the number of control voltages needed from (n+1) to 2, where (n+1) is the number of elements along the steering axis of the antenna configuration. Also, in electronic beam steered antennas, removal of active components such as large phase-shifter components reduces feed complexity, signal loss, power consumption, and operation variation due to external temperature changes. Also, when the mixer element is designed as part of the antenna element i.e. the mixing takes place in the antenna element and not because of an additional component, the power limitation of active components is removed.

BRIEF DESCRIPTION OF DRAWINGS

The present invention will be more clearly understood from the following description of embodiments thereof, given by way of example only, with reference to the accompanying drawings, in which:—

DETAILED DESCRIPTION OF THE DRAWINGS

Figure 1:
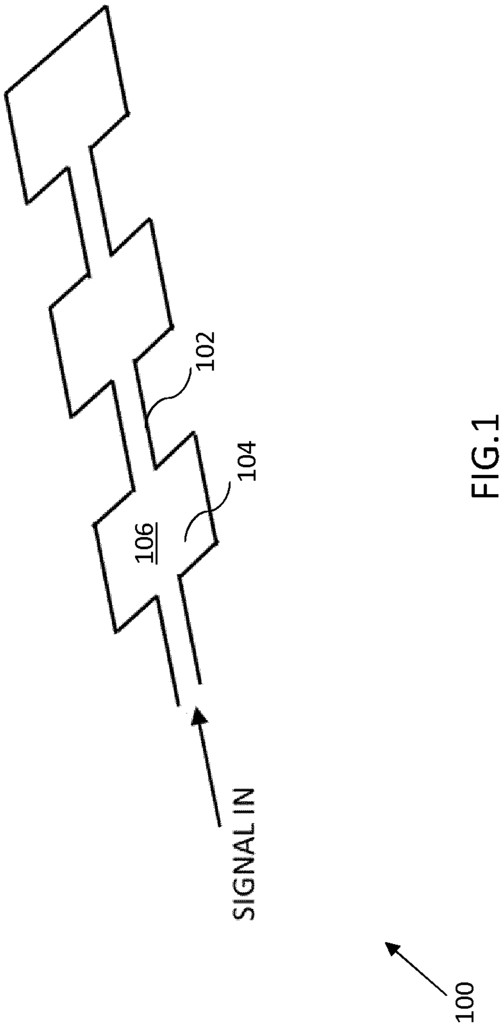
FIG.1 PRIOR ART
FIG. 1 illustrates a conventional series fed microstrip patch antenna array.
Figure 2:
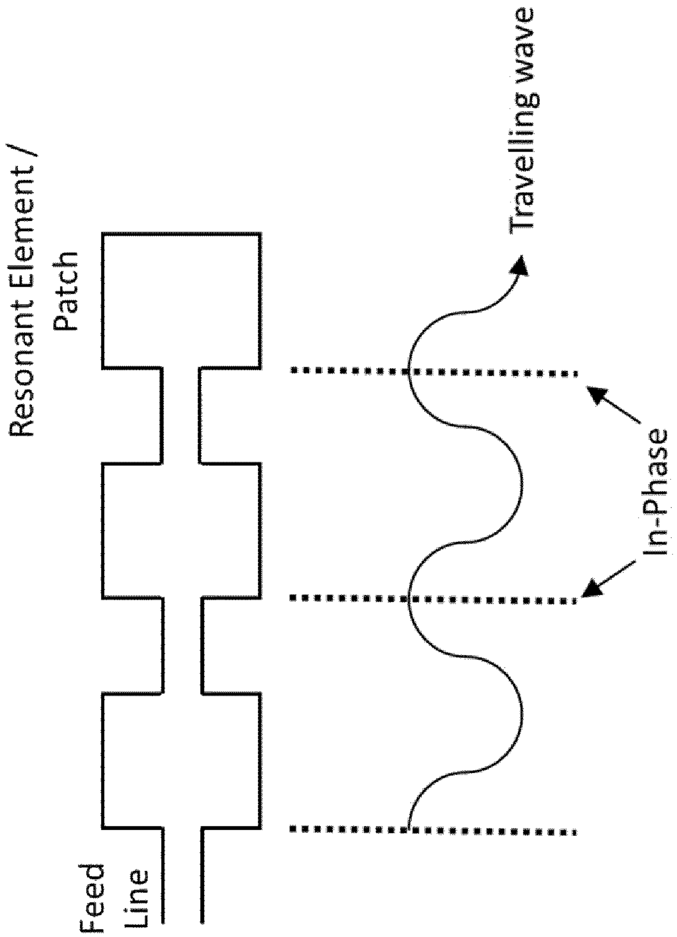
FIG.2 PRIOR ART
FIG. 2 illustrates the conventional operational mode for a typical series fed microstrip patch antenna array.
Figure 3:
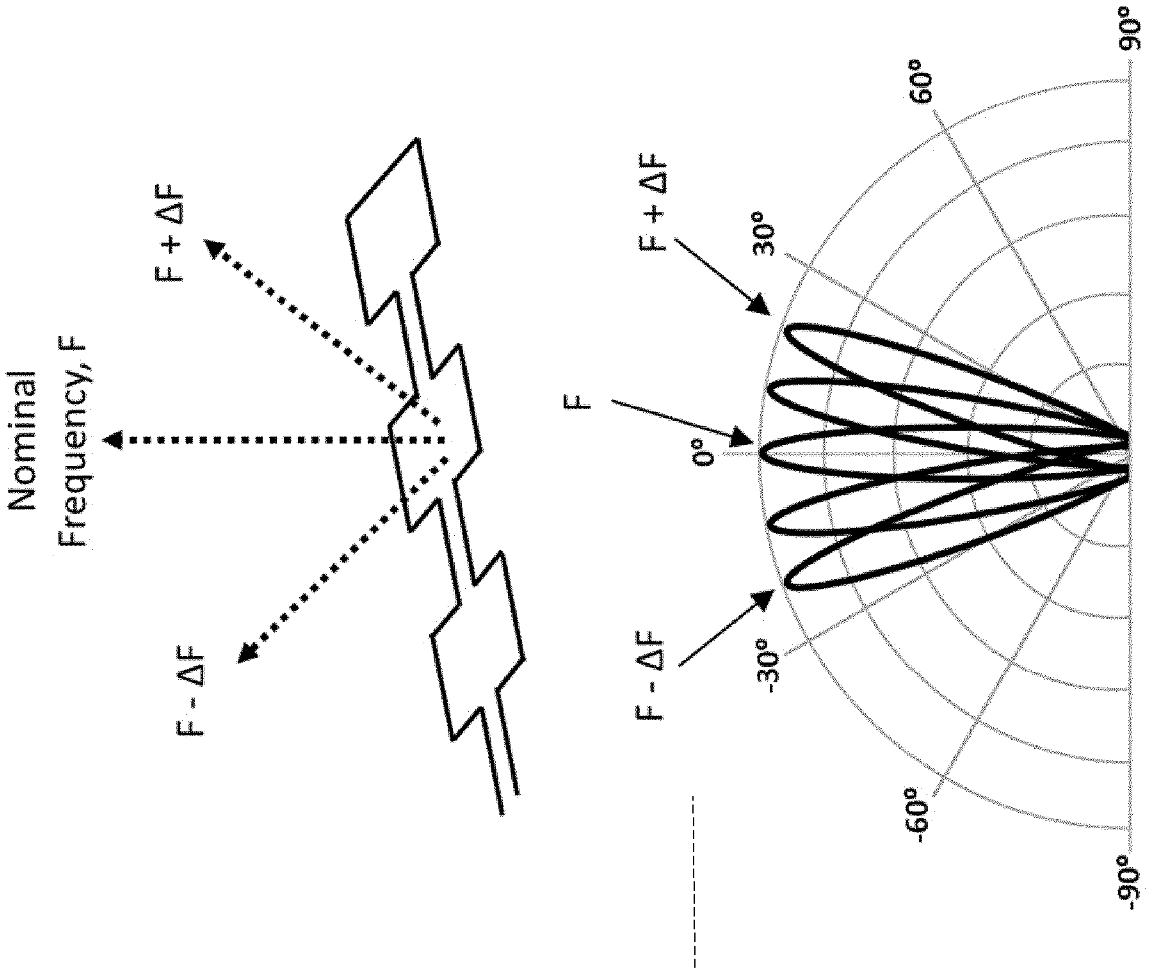
FIG.3 PRIOR ART
FIG. 3 illustrates how the variation of frequency in a series-fed microstrip patch antenna array has conventionally caused the radiation pattern to move as the frequency is varied.

FIG. 1 illustrates a conventional series-fed type antenna array 100, which is a common type of planar end-fed antenna array. In end-fed arrays, the feed line 102 should be narrow compared to the patch width 104, and the radiating patches 106 or 'resonant elements' themselves must be resonant so that the input line to the patch is well matched. In the simplest model of a patch antenna, this corresponds to a length of half of the guided wavelength. As the amplitude and phase of the radiated fields at each patch are determined by the cumulative characteristics of all the patches on the feed line, the transmission characteristics of the patches should be determined accurately in order to achieve the desired amplitude and phase distributions of the radiating currents along the array. Therefore, as illustrated in FIG. 2, since the resonant element length is approximately half of the guided wavelength, the connecting feed line 102 between elements must also be half of the guided wavelength for a summation of the radiated field at boresight. Those familiar in the technology however, will appreciate that in practice deviations from these distances will be observed. FIG. 2 also shows that should the frequency of operation change, then this balance will not be observed, and a progressive phase delay/lead will be introduced. By way of example, if a phase delay of $\Delta\phi$ degrees is introduced (as the result of a frequency change) between the $1^{st}$ and $2^{nd}$ patches then this delay would be increased to $2\Delta\phi$ between the $1^{st}$ and $3^{rd}$ patches, and a delay of $n\Delta\phi$ would be introduced between the $1^{st}$ and $(n+1)^{th}$ patches. This is the precise condition for a phased array whose operation would be known to those working in the field and allows the antenna's radiation pattern to be pointed or 'squinted' to an angle off boresight. Thus, as illustrated with reference to FIG. 3, with a series-fed patch array designed to operate at a specific frequency, by operating at frequencies above and below that, the beam may be squinted along the direction of the feed line. The disadvantage in this method however is that in order to scan or move the beam from the boresight direction, the frequency of operation must change.

Mathematically, this focusing effect produced in an array can be expressed as the array factor, which is a complex valued far-field radiation pattern of an array of isotropic radiators (i.e. theoretical antennas which have no directivity, and radiate equal energy in all directions). The one-dimensional array factor for a linear array is calculated at each discrete angle $\theta$ using:

$$AF(\theta, \Delta\phi) = \frac{\sin\left(N\left[\frac{\pi d}{\lambda}\sin(\theta) - \frac{\Delta\phi}{2}\right]\right)}{N\sin\left(\frac{\pi d}{\lambda}\sin(\theta) - \frac{\Delta\phi}{2}\right)} \tag{1}$$

Where N is the number of elements, d is the element separation, $\lambda$ is the wavelength of the operating frequency and $\Delta\phi$ is the phase shift between adjacent elements.

The relationship between the phase shift and the discrete pointing angle $\theta$ is expressed by:

$$\Delta\phi = \frac{2\pi d\sin(\theta)}{\lambda} = \frac{2\pi f d\sin(\theta)}{c} \tag{2}$$

Where f is the frequency of operation, and c is the speed of light in free space.

For microstrip feedlines of length l between the antenna elements, the electrical phase added by the length of the lines is related to frequency by:

$$\Delta\varphi = \beta l = \frac{2\pi l}{\lambda_g} = \frac{2\pi f l\sqrt{\varepsilon_{eff}}}{c} \tag{3}$$

Where $\lambda_g$ is the guided wavelength along the line, and $\varepsilon_{eff}$ is the effective permittivity of the microstrip line (closely related to relative permittivity of the substrate, $\varepsilon_r$.)

Note that this term holds for quasi-TEM lines such as Coplanar Waveguide (CPW) and grounded CPW lines, but for TEM lines such as sandwiched stripline, $\varepsilon_{eff}$ would be replaced by $\varepsilon_r$. Since $\lambda_g$ is smaller than the free space wavelength, $\lambda$, some trade-off is typically required in terms of the lengths of the patch antennas and feed line lengths, in order to maintain a spacing between the patch elements of $\lambda$, however, assuming the simplified model of FIG. 2, (i.e. $\lambda=\lambda_g$), this gives a phase difference between the elements at the centre frequency of the array, of:

$$\Delta\varphi = \beta l = \frac{2\pi\lambda}{\lambda} = 2\pi \tag{4}$$

Therefore the patch elements are in phase at the centre frequency. As the frequency, f, moves away from the centre frequency, $f_c$, however, the electrical length of the feed lines is scaled by a factor of $f/f_c$, therefore, the phase difference becomes:

$$\Delta\varphi = 2\pi\left(\frac{f}{f_c}\right) \tag{5}$$

Thus, it is possible to calculate at which angle $\theta$ the beam will be focused by the progressive phase shift $\Delta\phi$ added by the change of operating frequency.

Figure 4:
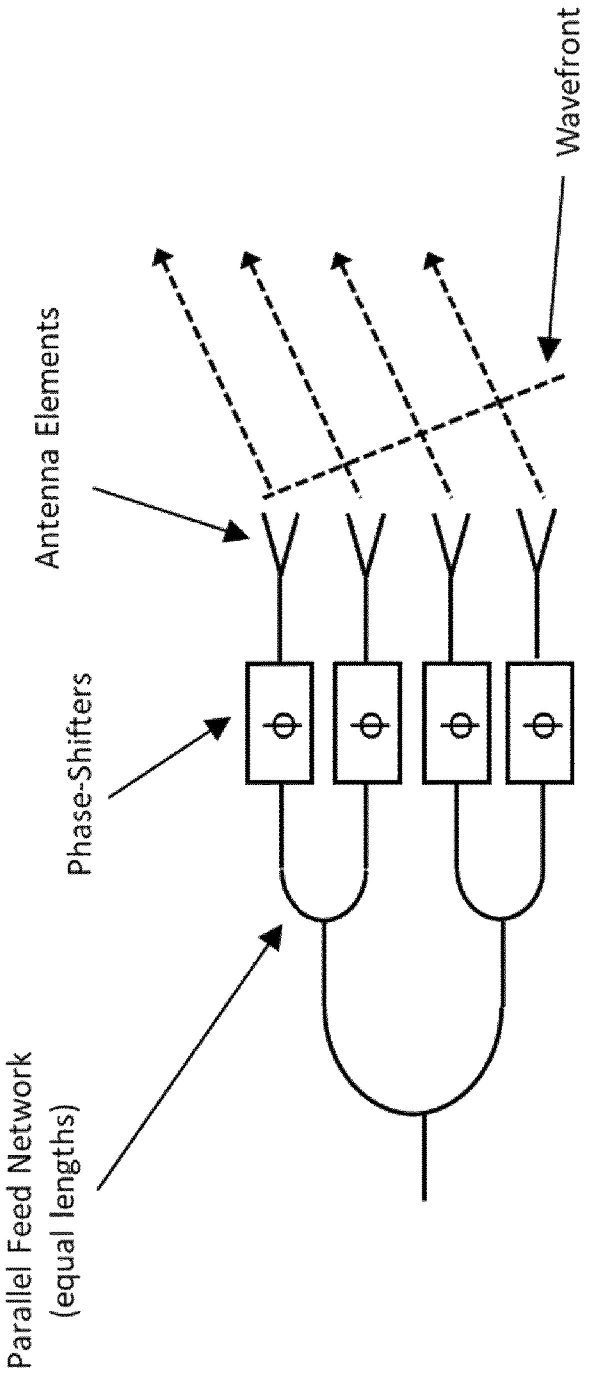
FIG.4 PRIOR ART
FIG. 4 illustrates a conventional phased array antenna.

In an alternative configuration as illustrated in FIG. 4, the progressive phase shift can be applied at subsequent patches by the addition of active components such as a phase-shifter or switched delay lines (where different lengths of lines, and therefore phases, can be applied as required by use of a switching network). Whilst a phased array is the most common method for electronic beam-steering, there are a number of issues that makes such an implementation unfeasible for high frequency mm-wave operation, such as the size of the antenna element which, along with the spacings between them, becomes significantly small when compared to the size of the phase-shifters, as they vary inversely in size to the operating frequency.

In a further alternative configuration, the number of resonant elements in the series fed antenna may be reduced to reduce the physical size of the antenna and increase the beamwidth of the radiation pattern in the $2^{nd}$ axis. However, this may lead to a reduction in the gain of the antenna.

In a further alternative configuration, the number of resonant elements in the series fed antenna may be increased to increase the gain of the antenna although the beamwidth of the radiation pattern in the orientation of the $2^{nd}$ axis would be reduced and the physical size would increase.

In a further alternative configuration, the spacings between the antenna elements may not be constant and a sparse array is implemented meaning that, although the array gain is not increased, the antenna main beamwidth is reduced. However, in such arrangements array sidelobe levels may increase. Further, the feed line lengths between elements in both axes will not be constant and must be calculated based on the actual array spacing between consecutive elements across each axis.

In a further alternative configuration, amplification components (or other scaling components) can be added at any point along the feed lines. This may lead to a reduction in loss/increase in array gain (or vice versa if attenuators used), and/or components may be used for amplitude tapering. However, it may lead to an increased design complexity.

Figure 5:
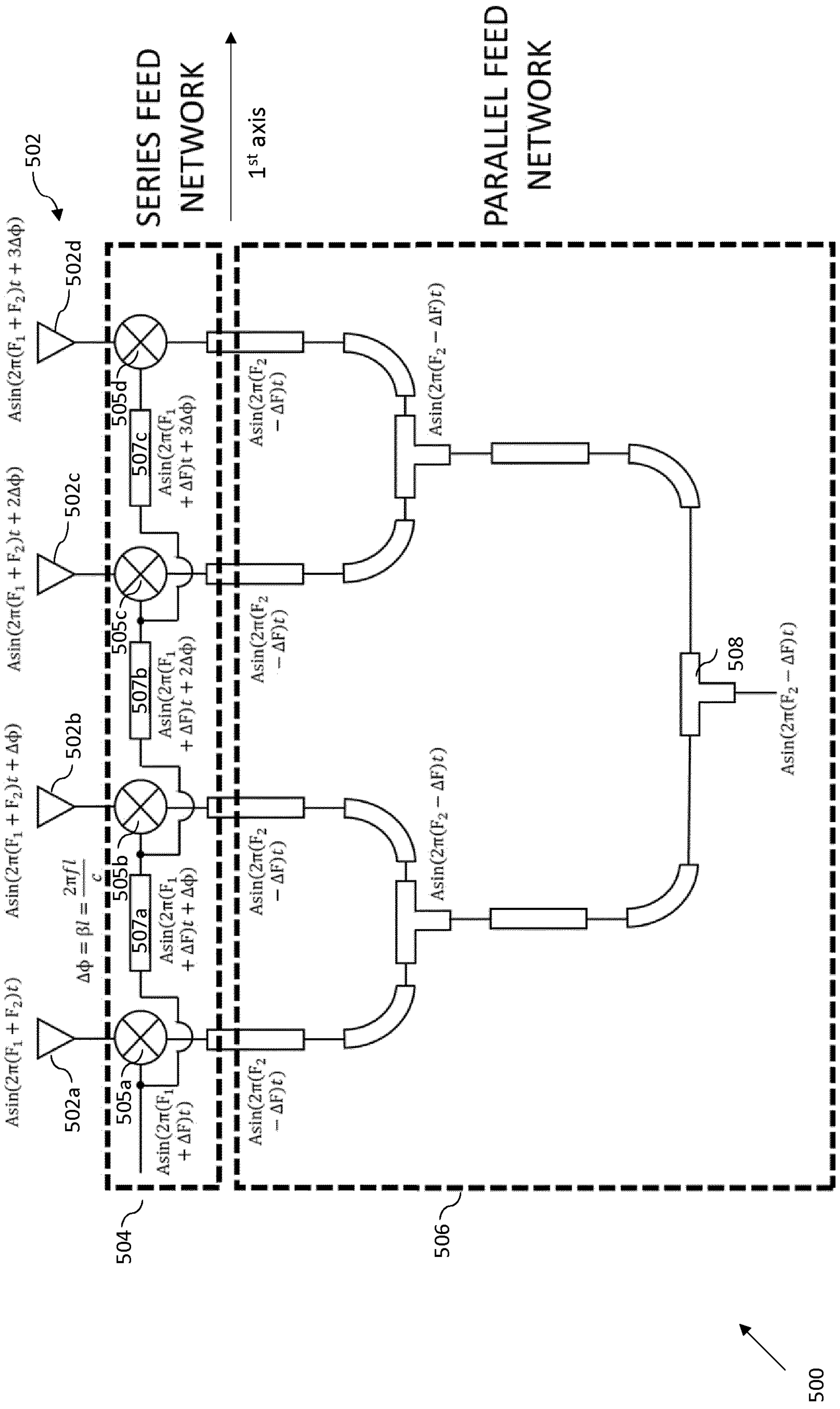
FIG. 5 illustrates a first electronic beam-steering antenna including a series feed network in the beam-scanning axis and a parallel feed network to maintain a constant output frequency, in accordance with a first embodiment of the present invention.

FIG. 5 illustrates a first electronic beam-steering antenna 500 that operates at a constant output frequency, in accordance with a first embodiment of the present invention.

The first electronic beam-steering antenna 500 includes first through fourth antenna elements 502*a* till 502*d* positioned in multiple parallel lines and disposed in a spaced apart manner with respect to each other. Examples of such antenna elements 502*a* till 502*d* include, but are not limited to, patch antennas, dipole antennas, monopole antennas, loop antennas and the like.

The first through fourth antenna elements 502_a_ till 502_d_ form an antenna array 502, in which beam steering/scanning occurs along an axis connecting the antenna elements 502_a_ till 502_d_. Although, four antenna elements are shown herein in the antenna array 502, it would be apparent to one of ordinary skill in the art, that the antenna array 502 may include more than or less than four antenna elements.

The first antenna 500 further includes first through fourth mixer elements 505_a_ till 505_d_ coupled to their respective first through fourth antenna elements 502_a_ till 502_d_. Each mixer element is configured to combine the frequencies of two input signals received at two input ports, and provides the signal of the combined frequency to their respective antenna element. Herein, the first through fourth mixer elements 505_a_ till 505_d_ are shown as separate components, but those familiar in the art will appreciate that this mixing property can be incorporated into the antenna elements 502_a_ till 502_d_ such as the quasi-Yagi antenna element with self-oscillating mixer designed by Sironen, which radiates at the combined frequency of the two input signals. When the mixer element is designed as part of the antenna element the mixing takes place in the antenna element, and not because of an additional component, so the power limitation of active components is removed.

The series feed network 504 feeds a first input port of each mixer element 505_a_ till 505_d_. The series feed network 504 includes first through third series feed lines 507_a_ till 507_c_ of fixed line lengths between adjacent mixer elements along the axis about which the beam steering occurs. In an example, the first series feed line 507_a_ is provided between the first and second mixer elements 505_a_ and 505_b_, the second series feed line 507_b_ is provided between the second and third mixer elements 505_b_ and 505_c_, and so on.

Further, a first voltage-controlled oscillator ($VCO_1$) (not shown), which can vary its output by frequency is placed at the input of the series feed network 504, and feeds a signal to an input port of the first mixer element 505_a_. In the context of the present invention, the line length of each of the series feed lines 507_a_ till 507_c_ is set to be a guided wavelength of the first centre frequency $F_1$, which is approximately the centre frequency of the tuning band of the $VCO_1$. In the $VCO_1$, the output frequency ($F_1$) is varied by the application of first tuning voltage $V_{T1}$ (i.e. $F_1 \propto V_{T1}$).

When the frequency of the $VCO_1$ is set at $F_1$, the signal from the $VCO_1$ would arrive in-phase at each mixer element 505_a_ till 505_d_ ($\Delta\varphi=\beta l=2\pi l/\lambda$; $l=\lambda$; therefore $\Delta\varphi=2\pi$ radians) and the antenna beam would be focused on boresight (directly in front of the array 502). However, if the frequency of operation is varied (by changing the tuning voltage $V_{T1}$) to a value of $F_1+\Delta F$, the fixed length l of series feed line introduces a phase delay of $\Delta\phi$ between the first and second mixer elements 505_a_ and 505_b_, and increases by a further value of $\Delta\phi$ at each consecutive mixer element along the series feed network 504. Thus, assuming a sinusoidal waveform is applied, the first mixer element 505_a_ receives an input signal equating to $A \sin(2\pi(F_1+\Delta F)t$, the second mixer element 505_b_ receives an input signal equating to $A \sin(2\pi(F_1+\Delta F)t+\Delta\phi)$, the third mixer element 505_c_ receives an input signal equating to $A \sin(2\pi(F_1+\Delta F)t+2\Delta\phi)$, and so on.

Here, the change in frequency is directly proportional to the change in phase, thus:

$$\Delta F \propto \Delta\phi \propto V_{T1} \tag{6}$$

Thus, based on equation (2) as described before, the beam scanning angle θ may also be set according to the tuning voltage applied to the $VCO_1$. The frequency of operation of the first $VCO_1$ is changed according to the change in pointing angle/scanning angle of the beam along the direction of the line connecting the antenna elements 502_a_ till 502_d_.

The parallel feed network 506 feeds a second input port of each mixer element 505_a_ till 505_d_ from a common connection point 508, where the length of each parallel feed line from the common connection point 508 to each of the mixer elements 505_a_ till 505_d_ is the same. The parallel feed network 506 is a conventional parallel feed network, where all elements are fed in-phase regardless of the applied frequency. In this case, the line lengths to each mixer element 505_a_ till 505_d_ are identical, so a phase variation is not applied if the input frequency changes. A second VCO ($VCO_2$) (not shown) which can vary its output by frequency is placed at the input of the common connection point 508, and feeds a common signal to the second input port of each mixer component 505_a_ till 505_d_. The $VCO_2$ operates nominally at a second centre frequency $F_2$, whose RF input to the antenna elements is modulated.

The frequency of operation of the second $VCO_2$, and thereby of the parallel feed network 506, is varied by the negative of the frequency change ΔF of the series feed network 504, such that the output frequency of the parallel feed network 506 is $F_2-\Delta F$. The beam steering operation of the antenna array 502 is independent to the second frequency of $VCO_2$, therefore, the second tuning voltage ($V_{T2}$) is adjusted so that the output frequency of the $VCO_2$ becomes $F_2-\Delta F$.

In operation, the series feed network 504 and parallel feed network 506 apply signals to each antenna element via the respective mixing elements 505_a_ till 505_d_ either before the feed point to the antenna element or as part of the antenna element's design. Each mixer element 505_a_ till 505_d_ combines the signals propagating on the two sets of feed lines by mixing the input signal of output frequency $F_1+\Delta F$ from the series feed network 504 with input signal of output frequency $F_2-\Delta F$ from the parallel feed network 506, to generate a mixed signal of output frequency as:

$$F_1 + \Delta F + F_2 - \Delta F \tag{7}$$

Thus, the output frequency of mixed signal from each mixer element 505_a_ till 505_d_ is the sum of the first and second frequencies, i.e. at $F_1+F_2$. If the signals applied by $VCO_1$ and $VCO_2$ are sinusoidal, a sinusoid at the $n^{th}$ array element will result which has a phase term that is dependent upon ΔF and l, the length of the series feed line from $VCO_1$ to each mixer element:

$$A\sin\left(2\pi(F_1 + F_2)t + (F_1 + \Delta F)(n - 1)\frac{2\pi l}{c}\right) \tag{8}$$

In this way, the array output frequency (given by the frequency term of the 2πft component) remains unchanged, with steering achieved by the change of only two control voltages instead of the prior art which requires control signals to be applied to each mixer element. Thus, the number of control voltages is reduced down from n to 2, where n is the number of antenna elements of the antenna

500. Although the case previously described uses sinusoidal waveforms, it will be appreciated that the invention is not restricted by this, and any waveform type can be applied without restriction.

Thus, by changing the frequency of operation in the series feed network 504, a phase-shift is introduced between each antenna element 502*a* till 502*d* along this axis, causing the beam to be directed at an angle that is thereby related to the frequency of operation. As discussed before, the series feed length of each series feed line 507*a* till 507*c* is designed such that the beam is directed at boresight in the middle of the tuning band of the $VCO_1$ and scans left or right along the first axis as the operating frequency is varied. Thus, electronic beam-steering is achieved without requiring large phase-shifter components at each antenna element, and which would currently limit the frequency of operation to approximately 50 GHz.

Also, by mixing the signal from the series feed network 504 with that from the parallel feed network 506 where the frequency has no effect on the beam position, the output array frequency is unchanged as the frequency changes on each network negate each other when combined by the mixer.

Although the signal of the second $VCO_2$ is modulated herein, it will be appreciated by those familiar in the art that either of the first and second $VCO_1$ and $VCO_2$ may be used as the modulated carrier for the application. Further, as $VCO_1$ and $VCO_2$ operate at similar frequencies, it is also appreciated that the cost of these components is much cheaper that those required for operation at higher frequencies, and that the antenna elements and array must be designed for this higher output frequency.

It is further noted that when the antenna elements 502*a* till 502*d* are not equally spaced or a sparse array is used, the invention is still valid as the line lengths 507*a* till 507*c* may be adjusted accordingly to provide the required phase shifts.

The first antenna 500 has a simpler component design as the components such as $VCO_1$ and $VCO_2$ operate at lower frequencies than the output array frequency. Each of the $VCO_1$ and $VCO_2$ may operate at frequencies typically half that of the operational output frequency. Also, the removal of active components such as phase-shifter elements at each antenna element leads to a reduced feed complexity, reduced signal loss, reduced power consumption, and reduced operational variation due to external temperature changes.

Figure 6:
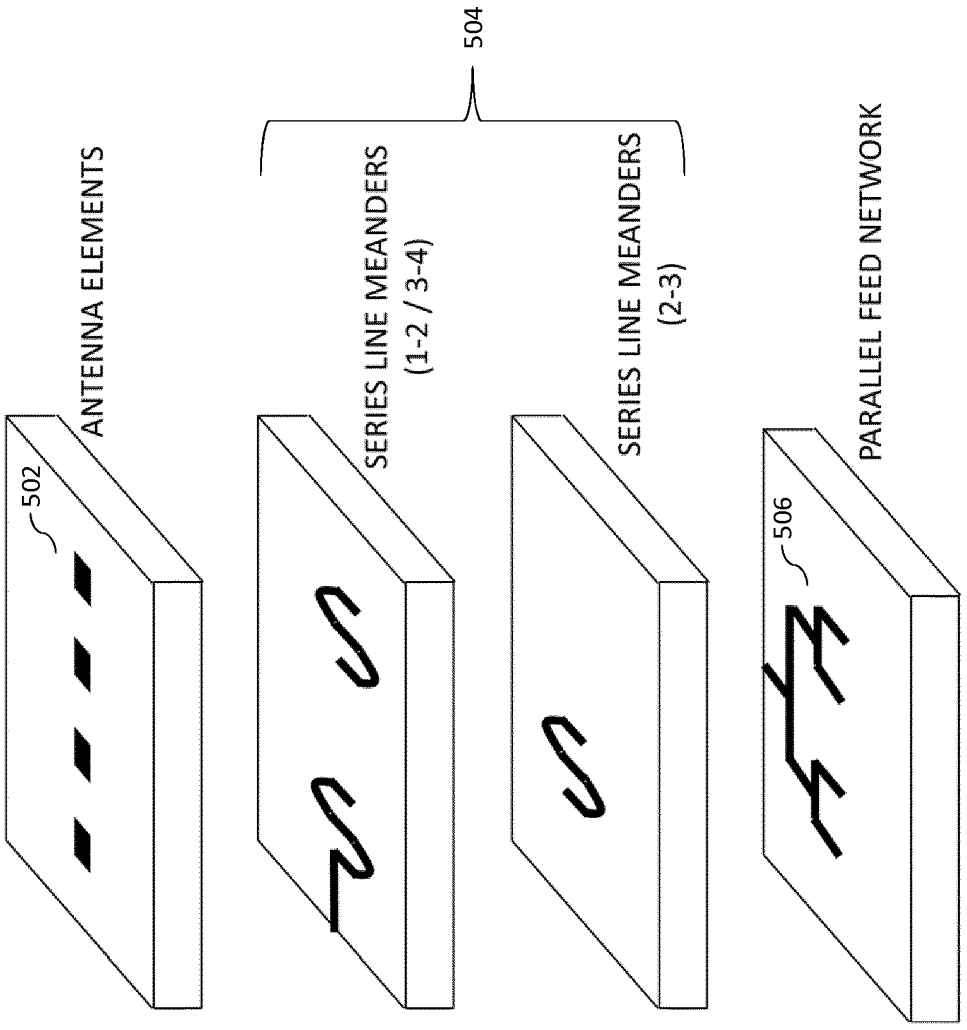
FIG. 6 illustrates an implementation of the first embodiment of the electronic beam-steering antenna in a multilayer substrate.

FIG. 6 illustrates implementing the first antenna 500 in a multilayer substrate. When $VCO_1$ and $VCO_2$ are identical, the series feed lines 507*a* till 507*c* between the mixer elements 505*a* till 505*d* must be approximately 4 times as long as the separation distance between mixer elements (assuming that $\lambda_g \approx \lambda$) and are completed in a multilayer device, using a layout similar (but not exclusive) to that shown in FIG. 6. Here, to avoid overlapping lines, the series feed lines are meandered to the correct length over two layers, where adjacent feed lines appear on different layers.

Figure 7:
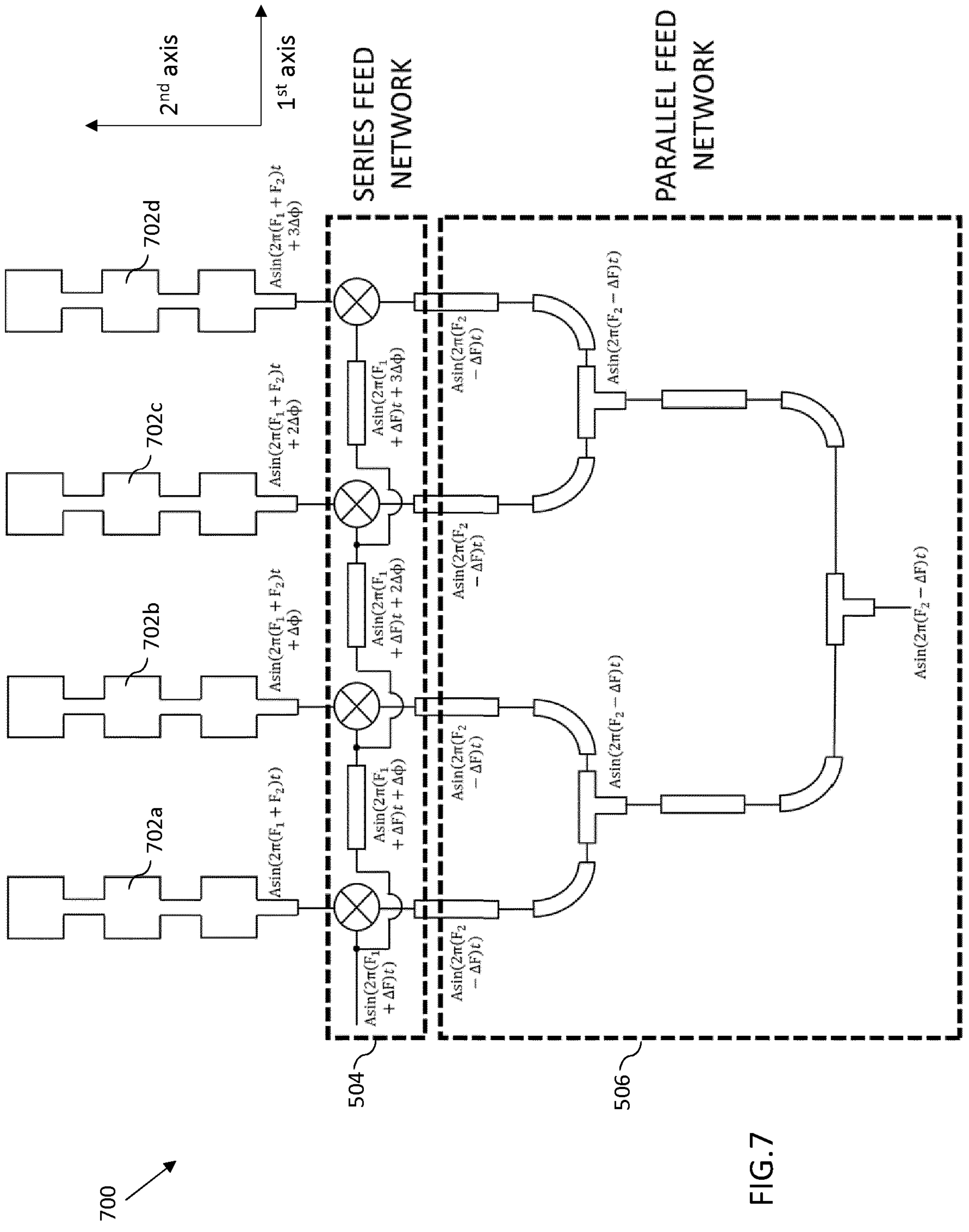
FIG. 7 illustrates a second electronic beam-steering antenna configuration including the series-fed arrays as being used for the antenna elements, in accordance with a second embodiment of the present invention.

FIG. 7 illustrates a second electronic beam-steering antenna 700 including the series-fed arrays being used for the antenna elements, in accordance with a second embodiment of the present invention.

The second antenna 700 is similar to the first antenna 500, except for the series-fed array being used as the antenna element. For instance, the first through fourth antenna elements 502*a*-502*d* of FIG. 5 have been replaced by the first through fourth series-fed arrays 702*a*-702*d* respectively in FIG. 7. The use of the first through fourth series fed arrays 702*a*-702*d* enable implementation of beam-steering over two axes. For the sake of clarity, each of the first through fourth series fed arrays 702*a*-702*d* are hereinafter referred to as a series-fed array. As described before, the first axis refers to beam scanning/steering axis along the line connecting the mixer elements 505*a* till 505*d*, and the second axis refers to a beam scanning/steering axis along an axis connecting the resonant patches of the series feed array.

In the second antenna 700, each series-fed array is designed to operate with the beam positioned at boresight when operating at the frequency $F_1+F_2$. Thus, as in the first embodiment (see, FIG. 5) when single axis scanning along only the $1^{st}$ axis is required, the tuning voltage of the second $VCO_2$ can be set so that it operates at the constant frequency of $F_1+F_2$ (by setting the outputs of the $VCO_1$ and $VCO_2$ to $F_1+\Delta F$ and $F_2-\Delta F$ respectively).

However, when a further frequency shift is introduced to the output frequency of $VCO_2$ (by changing $V_{T2}$ further) the output frequency of each series-fed array changes to $F_1+F_2+\Delta F_{ADD}$ and the beam direction moves along the $2^{nd}$ axis in proportion to $\Delta F_{ADD}$. The frequency of $VCO_2$ therefore should be adjusted (using $V_{T2}$) so that the output frequency is:

$$F_{VCO\_2} = F_2 - \Delta F + \Delta F_{ADD}$$

Although the output frequency of each series-fed array varies in this instance, 2-axis scanning is possible using this configuration. It would be apparent to one of ordinary skill in the art that the invention is not however restricted to this type or size of antenna and other similar types of antenna can be used. Likewise, any form of adjustment of the antenna such as amplitude tapering/size/element spacing etc. does not restrict the invention in any way. In addition to beam steering in two dimensions, the second antenna 700 carries all the advantages of the first antenna 500, except the operation of the antenna at a constant output frequency.

Figure 8:
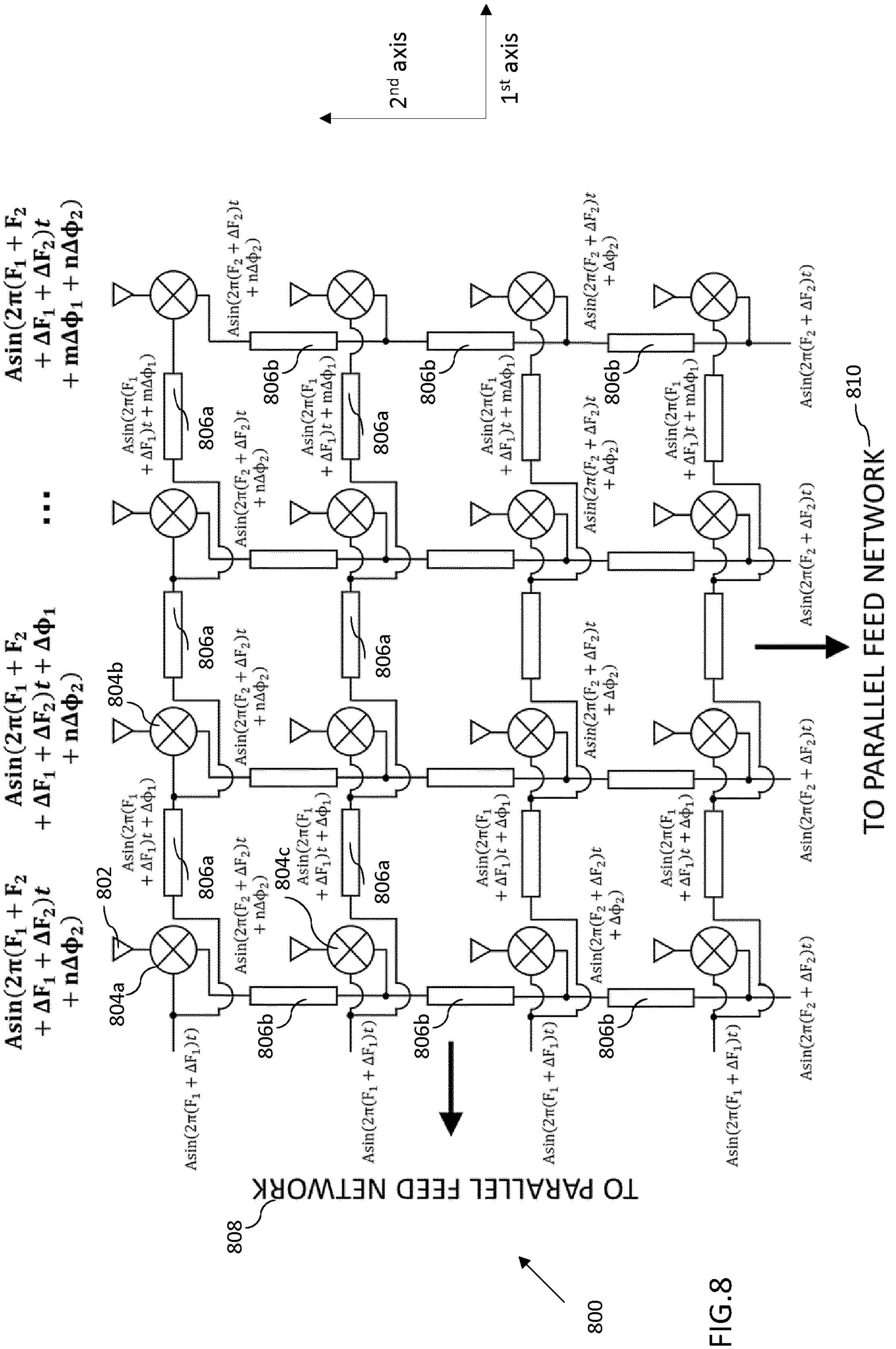
FIG. 8 illustrates a third electronic beam-steering antenna in which series feed lines are used in both axes to allow beam-steering over two dimensions, in accordance with a third embodiment of the present invention.

FIG. 8 illustrates a third electronic beam-steering antenna 800 in which series feed lines are used in both axes to allow beam-steering over two dimensions, in accordance with a third embodiment of the present invention.

The third antenna 800 forms an electronic beam-steering antenna where antenna elements 802 are positioned in multiple parallel lines, or preferably in a matrix configuration of (n+1) rows and (m+1) columns. A mixer element is provided to each antenna element 802, such that the mixer elements 804*a*, 804*b*, and 804*c* are also in a matrix configuration of (n+1) rows and (m+1) columns. Herein, the mixer element is shown as a separate component, but those familiar in the art will appreciate that this mixing property can be incorporated into the antenna element 802 such as the quasi-Yagi antenna with self-oscillating mixer designed by Sironen, which radiates at the combined frequency of the two input signals.

Further, in the third antenna 800, a series feed line of fixed line length is provided between adjacent antenna elements. In an example, a series feed line 806*a* is provided between the mixer elements 804*a* and 804*b*, a series feed line 806*b* is provided between the mixer elements 804*a* and 804*c*, and each is repeated in the first and second axes respectively. In the context of the present invention, the series feed lines connected in series along each row form a first set of series feed networks, and the series feed lines connected in series along each column form a second set of series feed networks. For examples, the series feed lines 806*a* connected in series along the first axis form a series feed network of the first set, and the series feed lines 806*b* connected in series along a second axis form a series feed network of the second set. In the given configuration 800, the first set includes four series feed networks along the first axis, and the second set includes four series feed networks along the second axis.

Preferably, each of the lines in each set of series feed lines have identical line length with the antenna element spacings along each axis being identical, although not necessarily the same on both axes. The beam steering occurs along the first and second axes corresponding to the first and second sets of series feed networks. When the antenna elements are not equally spaced or a sparse array is used however, the invention is still valid as the line lengths between elements can be adjusted according to this change in spacing.

The third antenna 800 further includes a first parallel feed network for feeding an input of each series feed network of the first set from a first common connection point (not shown), wherein the length from the first common connection point to the input of each series feed network of the first set is the same. The third antenna 800 further includes a second parallel feed network 810 for feeding an input of each series feed network of the second set from a second common connection point (not shown), wherein the length from the second common connection point to the input of each series feed network of the second set is the same.

Further, a first VCO ($VCO_1$) (not shown) feeds an input signal to the first common connection point, wherein the $VCO_1$ operates at a first centre frequency $F_1$. The frequency of the $VCO_1$ is changed according to the change in pointing angle of the beam along the first axis. When the change in the first frequency is denoted as $\Delta F_1$, the output frequency of the $VCO_1$ is $F_1+\Delta F_1$.

Similarly, a second VCO ($VCO_2$) (not shown) feeds an input signal to the second common connection point. The $VCO_2$ operates at a second centre frequency $F_2$. The frequency of the $VCO_2$ is changed according to the change in pointing angle of the beam along the second axis, perpendicular to the first axis. When the change in the second frequency is denoted as $\Delta F_2$, the output frequency of the $VCO_2$ is $F_2+\Delta F_2$.

Each of the mixer elements such as the mixer elements 804*a*, 804*b* and 804*c* combine the signals propagating on the respective first and second series feed networks. Each mixer element combines an input signal of frequency component $F_1+\Delta F_1$ from a series feed line of the first set with an input signal of frequency component $F_2+\Delta F_2$ from a series feed line of the second set, to generate a mixed signal of output frequency $F_1+F_2+\Delta F_1+\Delta F_2$. Also, the fixed length l of either the first or second sets of series feed networks introduces a phase delay of $\Delta\phi$ between adjacent mixer elements and increases by a further value of $\Delta\phi$ at each consecutive mixer element along the respective series feed network. In an example when sinusoidal signals are applied, the signal generated by the mixer component 804*a* in the $n^{th}$ row and $1^{st}$ column would be $A \sin(2\pi(F_1+F_2+\Delta F_1+\Delta F_2)t+n\Delta\phi_2)$, and the signal generated by the mixer component 804*d* in $n^{th}$ row and $m^{th}$ column would be $A \sin(2\pi(F_1+F_2+\Delta F_1+\Delta F_2)t+m\Delta\phi_1+n\Delta\phi_2)$, where $\Delta\phi_1$ is phase delay introduced by each series feed line along the first axis, and $\Delta\phi_2$ is phase delay introduced by each series feed line along the second axis.

The third antenna 800 enables the antenna pattern to be scanned in both directions where the tuning voltage of $VCO_1$ ($V_{T1}$) is proportional to the beam direction in the first axis, while the tuning voltage of $VCO_2$ ($V_{T2}$) is proportional to the beam direction in the second axis. However, the output frequency becomes $F_1+F_2+\Delta F_1+\Delta F_2$, which is not a constant output frequency.

It is to be noted that the third antenna 800 operates in a manner similar to the second antenna 700, however, the third antenna 800 includes two sets of series feed lines to enable beam steering along two axes. Thus, while the second antenna 700 removes the need for a more complex array configuration by removing a number of series feed lines, it is restricted by type of antenna element that must be used. It is also noted that, as in the cases of antennas 500 and 700, the individual lengths 806*a* and 806*b* between elements can be varied accordingly, without impact on the current invention, if a sparse array or non-identical antenna element spacings are used.

Figure 9:
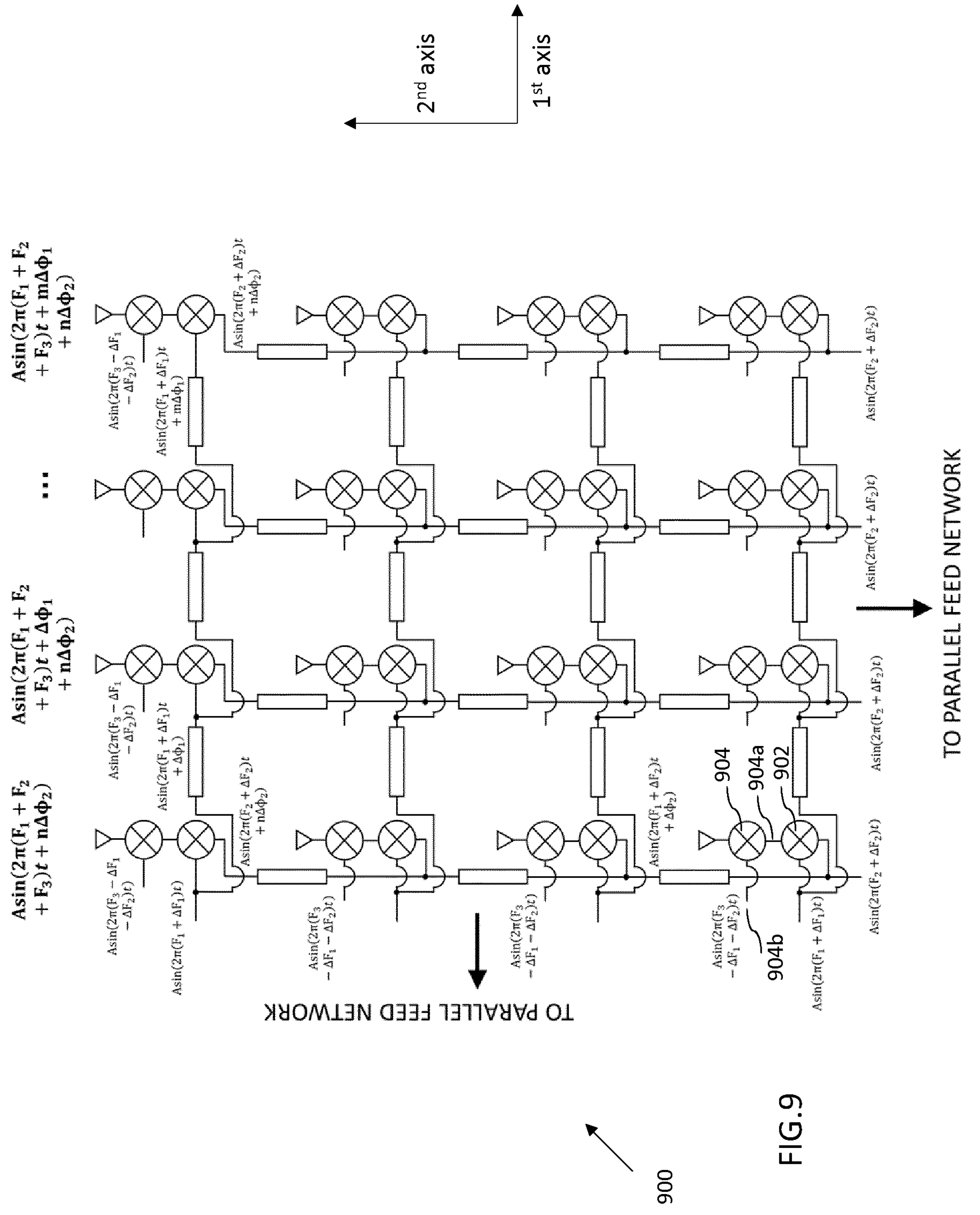
FIG. 9 illustrates a fourth electronic beam-steering antenna in which two mixers, two series feed lines and a parallel feed network are combined to allow beam-steering over two dimensions at a fixed output frequency, in accordance with a fourth embodiment of the present invention.

FIG. 9 illustrates a fourth electronic beam-steering antenna 900 in which two mixers, two series feed lines and a parallel feed network are combined to allow beam-steering over two dimensions at a fixed output frequency, in accordance with a fourth embodiment of the present invention.

The electronic beam-steering antenna 900 is similar to the third antenna 800, except for the inclusion of an additional mixer element at each antenna element of FIG. 8. Herein, an additional mixer element is placed at an output of each mixer element of the matrix configuration of (n+1) rows and (m+1) columns. In an example, the additional mixer element 904 is placed at an output of the mixer element 902. The mixers are shown as separate components in this configuration, but it will be appreciated to those familiar in the art that they can be incorporated as discrete components, or as part of the antenna elements, or as a combination thereof. Furthermore, the invention is not limited by the type of mixer used.

Further, a first input port 904*a* of the additional mixer element 904 receives output of the mixer element 902. The second input port 904*b* of the additional mixer element 904 is connected to a third parallel feed network (not shown). The third parallel feed network feeds a second input port of each additional mixer element from a common connection point (not shown, but similar to one shown in FIG. 5), where the length from the common connection point to each additional mixer element is the same. In the third parallel feed network, the line lengths to each mixer additional element are identical, so a phase variation is not produced across the outputs of the network if the input frequency changes. A third VCO ($VCO_3$) (not shown) operating at a centre frequency equal to a third frequency $F_3$ is placed at the input of the common connection point and feeds a common signal to the second input port of each additional mixer component. The frequency of operation of the $VCO_3$, and thereby on the third parallel feed network, is varied by the negative of the sum of the first and second frequency changes ($\Delta F_1+\Delta F_2$) of the $VCO_1$ and $VCO_2$, such that the output frequency of the $VCO_3$ is $F_3-(\Delta F_1+\Delta F_2)$.

Thus, in an example, the first input port 904*a* of the additional mixer element 904 receives a signal of output frequency $F_1+F_2+\Delta F_1+\Delta F_2$ from the mixer element 902, and the second input port of the additional mixer element 904 receives a signal of output frequency $F_3-(\Delta F_1+\Delta F_2)$ from the third parallel feed network. As a result of which, the additional mixer element 904 generates an output signal of frequency $F_1+F_2+\Delta F_1+\Delta F_2+F_3-\Delta F_1-\Delta F_2$, i.e. $F_1+F_2+F_3$.

It has previously been described with reference to FIG. 8, that by changing the frequency of the $VCO_1$ and $VCO_2$ connected to the first and second set of series feed lines, the beam-steering can be achieved over both axes where the output frequency becomes $F_1+F_2+m\Delta F_1+n\Delta F_2$ and (m+1) and (n+1) are the column and row numbers of the arrangement. By mixing this signal with a fixed-phase third $VCO_3$ operating nominally at $F_3$, and which can be adjusted to $F_3-\Delta F_1-\Delta F_2$ by changing $V_{T3}$, each additional mixer element generates an array output frequency that remains at $F_1+F_2+F_3$. Thus, by introducing an additional mixer, beam-scanning can be introduced over both axes, with the frequency of the third parallel feed network adjusted to maintain a constant array output frequency, which is the sum of the first, second and third frequencies.

Thus, the fourth antenna 900 carries all the advantages of the first, second and third antennas 500, 700 and 800, in addition to maintaining a constant array output frequency. Further as in the case of the first, second and third antennas, 500, 700 and 800, the individual lengths between elements can be varied without impact on the current invention, if a sparse array or non-identical antenna element spacings are used.

Each of the first, second, third and fourth antennas 500, 700, 800 and 900 may be designed for use in an application where beam steering is required such as ground to non-geostationary satellite communications, radar, defence, automotive, warfare and communication applications.

In the specification the terms "comprise, comprises, comprised and comprising" or any variation thereof and the terms include, includes, included and including" or any variation thereof are considered to be totally interchangeable, and they should all be afforded the widest possible interpretation and vice versa.

The invention is not limited to the embodiments hereinbefore described but may be varied in both construction and detail.

The invention claimed is:

1. An electronic beam-steering antenna, comprising:

a plurality of antenna elements disposed in a spaced apart manner with respect to each other, wherein beam steering occurs along a first axis connecting the plurality of antenna elements, wherein a feed line is provided between each of the adjacent antenna elements, and wherein each of the feed lines are connected in series along the first axis, and wherein each antenna element radiates a mixed signal generated by combining frequencies of first and second input signals, wherein the first input signal is received from an output of a feed line preceding said antenna element and has a first frequency which varies with a change in beam pointing angle along the first axis;

a plurality of mixer elements corresponding to the plurality of antenna elements, wherein each mixer element has an output port connected to an input port of the respective antenna element;

a series feed network formed from the feed lines connected in series, each feed line being provided between adjacent mixer elements, and a branched output of each feed line connected in series preceding a mixer element is connected to a first input port of said mixer element; and a parallel feed network for feeding a second input port of each mixer element with the second input signal having a second frequency from a common connection point, where the length of each parallel feed line from the common connection point to each mixer element is the same;

wherein each antenna element is a series-fed array and wherein the beam steering additionally occurs along a second axis connecting resonant elements of the respective series-fed array, wherein the second axis is perpendicular to the first axis, and the beam pointing angle along the second axis varies by varying the second frequency.

2. The electronic beam-steering antenna as claimed in claim 1 further comprising:

a first voltage controlled oscillator ($VCO_1$) for feeding the input signal to the series feed network, wherein the $VCO_1$ outputs a signal of the first frequency that varies with respect to a first centre frequency, with a change in beam pointing angle along said axis; and a second VCO ($VCO_2$) provided at an input of the common connection point, for feeding the second input signal to the parallel feed network, wherein the $VCO_2$ has a second centre frequency and outputs a signal of the second frequency, wherein each mixer element combines the signals received from the respective series and parallel feed networks, to generate a mixed signal at the output frequency, and wherein the output frequency is the sum of the first and second frequencies.

3. The electronic beam-steering antenna as claimed in claim 2, wherein the fixed line length of each feed line forming the series feed network is set to be a guided wavelength of the first centre frequency.

4. The electronic beam-steering antenna as claimed in claim 2, wherein when the second frequency varies with respect to a second centre frequency by the negative of the change in frequency of the $VCO_1$, the output frequency is a constant frequency, and is the sum of the first and second centre frequencies.

5. An electronic beam-steering antenna comprising:

a plurality of antenna elements disposed in a spaced apart manner with respect to each other, wherein a feed line is provided between each of the adjacent antenna elements, and wherein each antenna element radiates a mixed signal generated by combining frequencies of first and second input signals, wherein the plurality of the antenna elements are positioned in a matrix configuration of n+1 rows and m+1 columns, and a plurality of mixer elements corresponding to the plurality of antenna elements is also positioned in the matrix configuration of n+1 rows and m+1 columns, and wherein feed lines connected in series along each row form a first set of series feed networks, and feed lines connected in series along each column form a second set of series feed networks, and wherein beam steering occurs along the first and second axes corresponding to first and second frequencies applied to the first and second sets of series feed networks;

a first parallel feed network for feeding an input of each series feed network of the first set from a first common connection point, wherein the length from the first common connection point to the input of each series feed network of the first set is the same; and a second parallel feed network for feeding an input of each series feed network of the second set from a second common connection point, wherein the length from the second common connection point to the input of each series feed network of the second set is the same;

a first voltage controlled oscillator ($VCO_1$) for feeding an input signal to the first common connection point, wherein the $VCO_1$ outputs the first frequency that varies with respect to a first centre frequency, with a change in the beam pointing angle along the first axis;

a second VCO ($VCO_2$) for feeding an input signal to the second common connection point, wherein the $VCO_2$ outputs the second frequency that varies with respect to a second centre frequency, with a change in the beam pointing angle along the second axis, wherein each mixer element receives the first input signal at a first input port branching off from a feed line preceding said antenna element along the first axis, and the second input signal at a second input port branching off from a feed line preceding said antenna element along the second axis, to generate a mixed signal of an output frequency, wherein the output frequency is the sum of the first and second frequencies;

a plurality of additional mixer elements corresponding to the plurality of mixer elements, each additional mixer element having a first input port connected to an output port of a respective mixer element, a second input port connected to a third common connection point, and an output port connected to the respective antenna element;

a third parallel feed network for feeding the second input port of each additional mixer element from the third common connection point, wherein the length from the third connection point to the second input port of each additional mixer element is the same; and a third voltage controlled oscillator ($VCO_3$) for feeding an input signal to the third common connection point, wherein the $VCO_3$ has a third frequency that varies with respect to a third centre frequency by the negative of the sum of the change in the frequencies of $VCO_1$ and $VCO_2$, wherein each additional mixer element combines the signals received from the outputs of the respective mixer element and the third common connection point to generate a mixed signal of constant output frequency, wherein the constant output frequency is the sum of the first, second and third centre frequencies.

6. The electronic beam-steering antenna as claimed in claim 5, wherein the feed lines are formed using a multilayer substrate structure.

7. The electronic beam-steering antenna as claimed in claim 5, wherein each feed line of fixed line length of a series feed network introduces a phase delay of $\Delta\phi$ between adjacent mixer elements, and the phase delay increases by a further value of $\Delta\phi$ at each consecutive mixer element along the corresponding series feed network.

8. The electronic beam-steering antenna as claimed in claim 5, wherein each feed line of a series feed network introduces a phase delay between adjacent mixer elements in proportion to separation distance between adjacent antenna elements; and the phase delay increases at each consecutive mixer element along the corresponding series feed network.

* * * * *